United States Patent [19]
Wetherell

[11] 3,846,638
[45] Nov. 5, 1974

[54] IMPROVED COUPLING ARRANGEMENT FOR POWER LINE CARRIER SYSTEMS

[75] Inventor: Daniel L. Wetherell, Lynchburg, Va.

[73] Assignee: General Electric Company, Lynchburg, Va.

[22] Filed: Sept. 6, 1973

[21] Appl. No.: 394,559

Related U.S. Application Data

[63] Continuation-in-part of Ser. No. 294,244, Oct. 2, 1972, abandoned.

[52] U.S. Cl. ............................. 307/3, 340/310 R
[51] Int. Cl. ...................................... H04m 11/00
[58] Field of Search ............... 307/1, 3; 340/310 R

[56] References Cited
UNITED STATES PATENTS

| | | | |
|---|---|---|---|
| 2,253,393 | 8/1941 | Pakala | 340/310 R |
| 2,336,258 | 12/1943 | Kenefake | 340/310 R |
| 2,743,434 | 4/1956 | Fleming | 340/310 R |
| 2,756,414 | 7/1956 | Doremus | 340/310 R |
| 3,696,383 | 10/1972 | Oishi et al. | 340/310 R |

Primary Examiner—A. D. Pellinen

[57] ABSTRACT

A power line carrier system is coupled to two or more phase wires of an electrical power transmission line by transformers and coaxial transmission lines. Each phase wire to be used is provided with a coupling capacitor which is respectively coupled to one end of a coaxial line through an impedance matching transformer. The other ends of the coaxial lines are coupled to the carrier system through one or more isolation transformers. Use of this coupling arrangement eliminates the previously used, exposed unbalanced lines, and their inherent disadvantages. Where a plurality of phase wires are used, this arrangement permits the carrier to be coupled to the phase wires with various relative voltage magnitudes and various relative phases.

8 Claims, 7 Drawing Figures

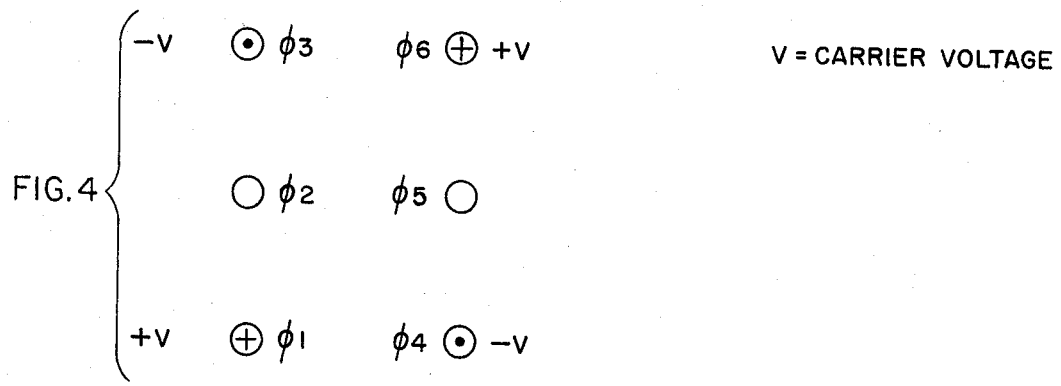
V = CARRIER VOLTAGE
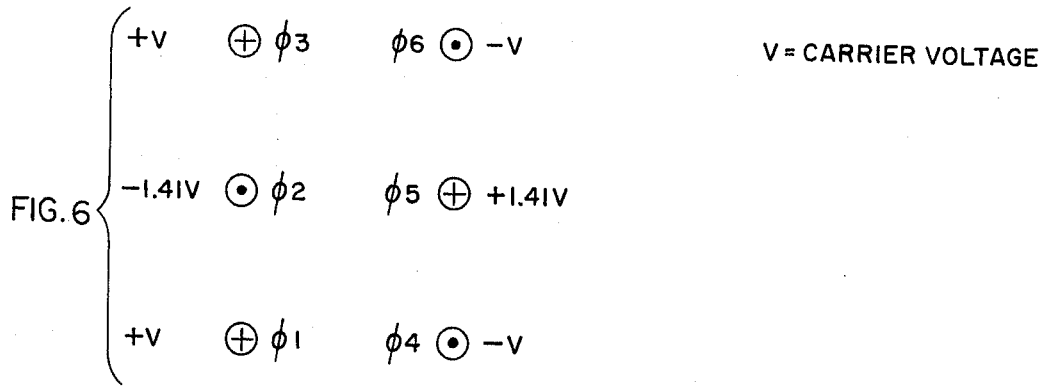
V = CARRIER VOLTAGE

IMPROVED COUPLING ARRANGEMENT FOR POWER LINE CARRIER SYSTEMS

CROSS REFERENCE TO RELATED APPLICATION

This application is a continuation-in-part of my pending application entitled "Improved Coupling Arrangement for Power Line Carrier Systems" filed Oct. 2, 1972, Ser. No. 294,244, now abandoned.

BACKGROUND OF THE INVENTION

My invention relates to a coupling arrangement, and particularly to an improved arrangement for coupling a power line carrier system to two or more phase wires of an electrical power transmission line or lines.

Electrical power companies use carrier systems on their power transmission lines to provide relatively economical communication, switching, and telemetering circuits between locations on the power transmission lines. Since the electrical power line may introduce or be exposed to considerable noise, it is very desirable that the carrier system be coupled to the transmission line as efficiently as possible to provide a good carrier signal. Further, since the carrier system is generally coupled to the electrical power transmission line at a switchyard or a power generating station where many high voltage lines and apparatus are present it is also desirable that the coupling arrangement be as unobstrusive as possible. As far as I am aware, previous coupling arrangements for power line carrier systems have used exposed, unbalanced transmission lines between the carrier system and the coupling equipment connected to the electrical power lines. Such exposed lines are vulnerable to weather and service equipment; they get in the way of activites around the switchyard or power lines; and they are a source of noise.

Accordingly, a primary object of my invention is to provide an improved arrangement for coupling a carrier system to an electrical power transmission line.

Another object of my invention is to provide an improved power line carrier system coupling arrangement that permits the coupling lines to be placed underground, thereby minimizing exposure of the lines to weather, noise, and apparatus.

Another object of my invention is to provide an improved power line carrier system coupling arrangement that permits carrier systems to be coupled to two or more phases of an electrical power transmission line in a more efficient and reliable manner.

SUMMARY OF THE INVENTION

Briefly, these and other objects are achieved in accordance with my invention by a coupling arrangement that utilizes a coaxial transmission line for each of the phase wires of the power line to which the carrier system is to be coupled. An impedance matching transformer is respectively connected between one end of each coaxial line and each phase wire coupling capacitor. The other ends of the coaxial lines are coupled to the carrier system through an isolation transformer or transformers. Since the impedance matching transformers can be positioned very close to the coupling capacitor (which are usually directly beneath each phase wire of the powerline) each coaxial line can go underground from its matching transformer for connection to the isolation transformer. The previously exposed unbalanced transmission lines are eliminated by my coupling arrangement. My coupling arrangement presents less obstructions and has very little or no exposure above ground. My coupling arrangement also permits the carrier to be coupled to the phase wires in various relative voltage magnitudes and in various relative phases. Thus, a better and more reliable carrier system can be provided.

BRIEF DESCRIPTION OF THE DRAWING

The subject matter which I regard as my invention is particularly pointed out and distinctly claimed in the claims. The structure and operation of my invention; together wih further objects and advantages, may be better understood from the following description given in connection with the accompanying drawing, in which:

FIG. 4 shows a transmission line with two three-phase systems and a preferred coupling of a carrier signal to four of the six phase wires;

FIG. 6 shows a transmission line with two three-phase systems, and a preferred coupling of a carrier signal to all six of the phase wires.

DESCRIPTION OF THE PREFERRED EMBODIMENTS

Figure 1:
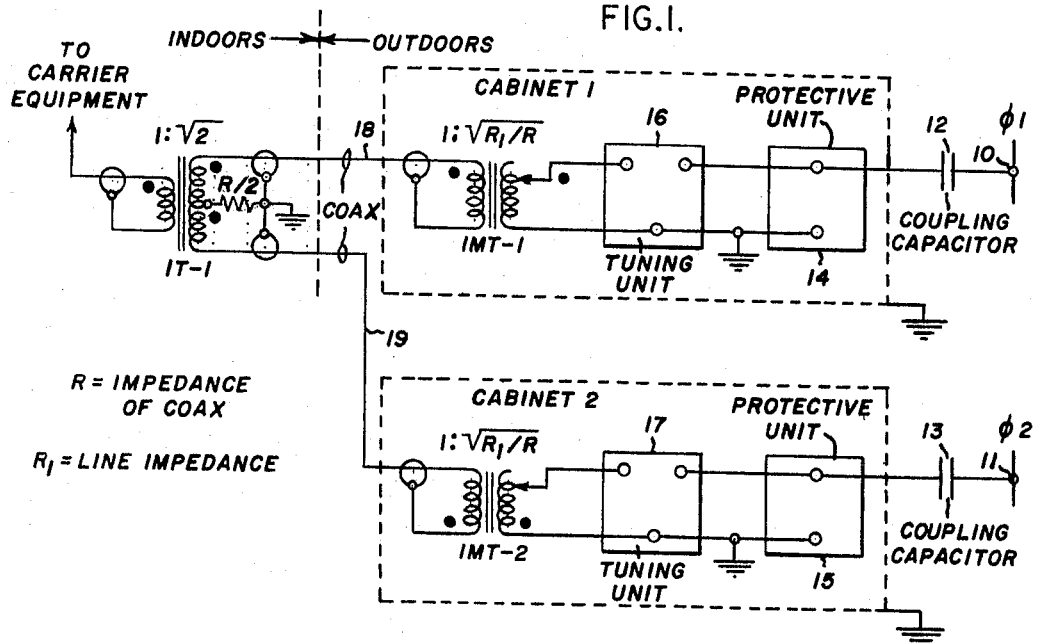
FIG. 1 shows an improved coupling arrangement in accordance with my invention for coupling a power line carrier system to two phase wires of an electrical power transmission line.

Persons skilled in the power line carrier art appreciate and understand that for the best transmission efficiency and the lowest noise, all phase wires of an electrical power transmission line should be used. However, in order to couple a carrier system to all phase wires, relatively expensive equipment is needed for each of the phase wires to which the equipment is coupled. Accordingly, coupling to less than all phase wires may be utilized. In those situations where coupling is made to only one phase wire, my invention is not applicable. However, my invention is applicable to situations where coupling is provided to two or more phase wires of an electrical power transmission line. FIG. 1 shows a schematic diagram of an improved coupling arrangement in accordance with my invention for coupling a power line carrier system to two phase wires $\phi 1$ and $\phi 2$ which extend from the station location shown to a distant location where a similar coupling arrangement and system would be provided. The phase wires $\phi 1$ and $\phi 2$ may be in the same line or in separate lines. The carrier system is connected to the phase wires $\phi 1$ and $\phi 2$ at the respective points 10, 11. Each of the phase wires φ1 and φ2 is provided with a line trap (not shown) on the station side of the points 10, 11 so as to keep carrier signals from being attenuated in the station power equipkent. In order to make a connection to the phase wires φ1 and φ2, coupling capacitor 13 is connected to the point 11. As known, these coupling capacitors 12, 13, in conjunction with tuning equipment, provided a relatively low impedance to carrier signals in the kilohertz range, but a relatively high impedance to the 60 cycle electrical power on the transmission lines. Thus, the carrier signals can be coupled to the high voltage lines without the carrier equipment being directly connected to the high voltages. Usually, protective and tuning equipment is provided for each of the phase wire connections. This equipment is housed in outdoor cabinets 1 and 2, indicated by dashed lines. It is desirable that the cabinets 1 and 2 be located as near the respective phase wires φ1 and φ2 as possible, so as to keep the length of wires or leads between the cabinets and coupling capacitors as short as possible. The protective equipment includes units 14, 15 which generally comprise an arc gap that grounds the line connected to the coupling capacitors 12, 13 in the event of a high voltage surge. The protective units 14, 15 are connected to respective tuning units 16, 17 which provide the necessary tuning circuits for the carrier equipment. These tuning circuits may include series and parallel resonant circuits to provide the desired filtering and impedance ratios. The equipment described thus far is known in the art. Previously, the tuning units 16, 17 have been coupled to the power line carrier equipment through single wires which are unbalanced and insulated with respect to ground. Such single wires have presented quite a problem to the design and utilization of power switchyards or generating stations because the wires have had to be insulated and protected. It is the purpose of my invention to eliminate such wires and provide an improved coupling arrangement.

In accordance with my invention, I provide impedance matching transformers IMT-1 and IMT-2 in the respective cabinets 1 and 2. The primary windings of each of the transformers IMT-1 and IMT-2 are preferably provided with an adjustable tap, and are connected to the tuning units 16, 17. The secondary windings of the transformers IMT-1 and IMT-2 are respectively connected to the inner conductors of two coaxial transmission lines 18, 19. The lines 18, 19 are of the known and conventional type having a cylindrical outer conductor and a concentric, insulated inner conductor. The coaxial lines 18, 19 are indicated schematically in that the outer conductors are only shown at the respective ends of the lines 18, 19. The outer conductors of the coaxial lines 18, 19 may be grounded. This permits the coaxial lines 18, 19 to extend from their respective cabinets 1 and 2 directly underground, and extend through the switchyard to the carrier equipment which is in a building. The building location is indicated by the vertical dashed line at the left of FIG. 1. The apparatus described thus far is usually outdoors as indicated. Indoors, or within the building, the inner conductors of the coaxial lines 18, 19 are respectively connected to the ends of the primary winding of an isolation transformer IT-1. The primary winding of this transformer IT-1 is centertapped and connected through a resistor R/2 to ground. The impedance ratios of the various transformers are indicated in FIG. 1. In these ratios, R represents the impedance of the coaxial lines 18, 19 and $R_1$ represents the impedance of the lines between the transformers IM-1 and IMT-2 and the tuning units 16, 17. The transformers of FIG. 1 are shown with polarity dots which, as known in the art, indicate the corresponding instantaneous voltages in the windings. These transformers are shown as having iron cores but they may also be air core transformers. The secondary winding of the isolation transformer IT-1 is connected by a transmission line (preferably coaxial as shown) to the carrier equipment which, as known in the art, transmits and receives carrier frequency signals over the phase wires φ1 and φ2. Thus, the impedance matching transformers IMT-1 and IMT-2, the coaxial lines 18, 19, and the isolation transformer IT-1, when connected in accordance with my invention, provide an improved coupling arrangement which permits the coaxial lines 18, 19 to be buried between the outdoor cabinets (which are located near their respective phase wires φ1 and φ2) and the building (some distance away) which houses the power line carrier equipment. This eliminates the exposed, unbalanced, insulated lines which were previously required in power switchyards to couple the carrier equipment to the cabinets positioned outdoors near their respective power phase wires. The coupling arrangement of FIG. 1 provides further improvement over the prior art in that if one of the coaxial lines 18, 19 fails for some reason, the carrier equipment is still coupled to one of the two phase wires φ1 or φ2 with a transmitter coupling loss of 3 dB. This permits the carrier equipment to continue to operate through the other of the coaxial lines 18, 19.

Figure 2:
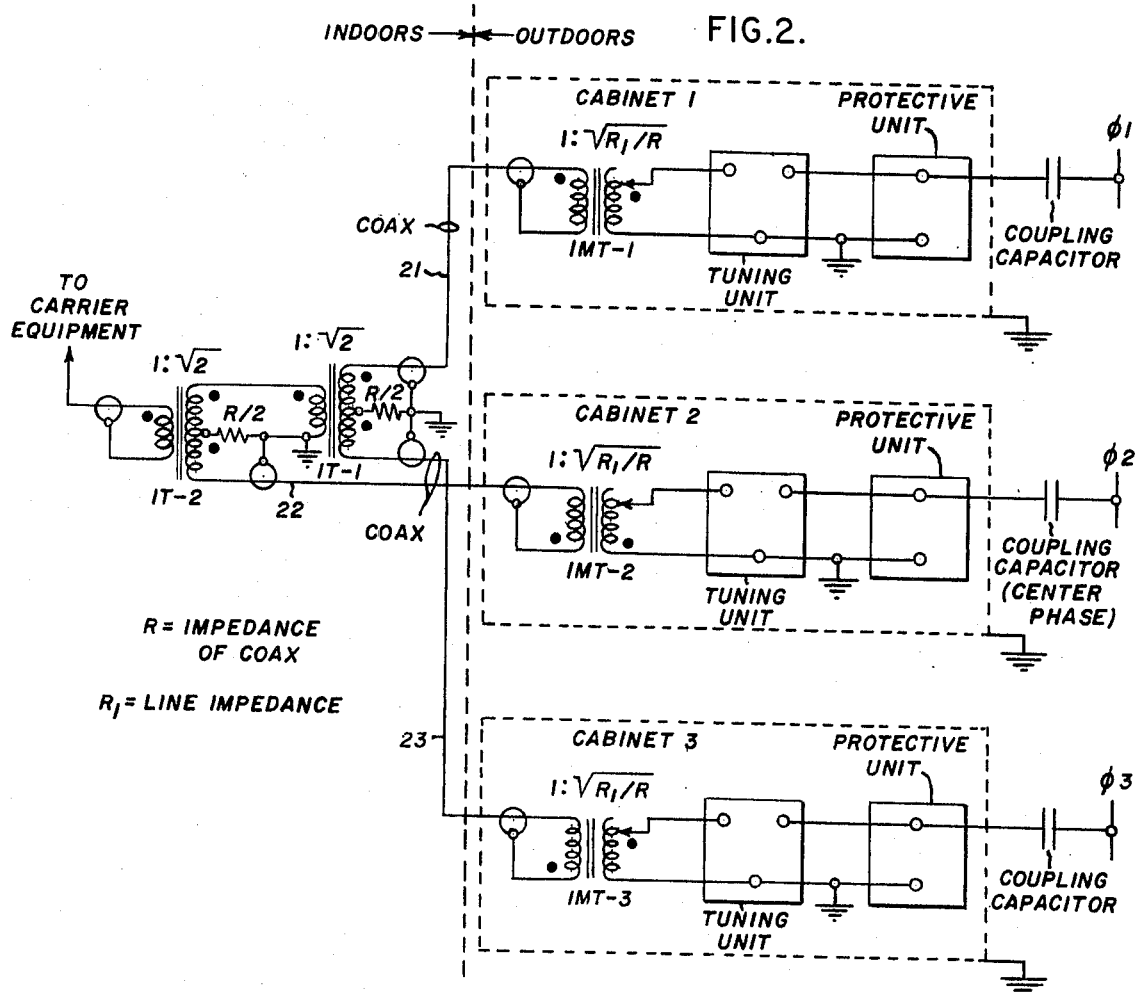
FIG. 2 shows an improved coupling arrangement in accordance with my invention for coupling a power line carrier system to three phase wires of an electrical power transmission line.

While the circuit of FIG. 1 is an improvement over the prior art, the better carrier transmission provided by using all three phase wires of a single circuit power transmission line may be desirable. In such a case, a coupling arrangement for all three phase wires in accordance with my invention is shown in FIG. 2. In FIG. 2, each of the phase wires φ1, φ2, and φ3 (which may be in one line or in separate lines) is provided with a respective cabinet containing equipment and designations similar to that shown in FIG. 1. The impedance matching transformers IMT-1 and IMT-3 for the two outer phase wires φ1 and φ3 are connected through respective inner conductors of coaxial transmission lines 21, 23 to the ends of the primary winding of an isolation transformer IT-1. This primary winding is centertapped and connected through a resistor R/2 to ground. The secondary winding of this isolation transformer IT-1 is connected to one end of the primary winding of a second isolation transformer IT-2, and through a resistor R/2 to a center tap on this primary winding. The other end of the primary winding of the isolation transformer IT-2 is connected through the inner conductor of a coaxial transmission line 22 to the impedance matching transformer IMT-2 of the phase wire φ2. The secondary winding of the transformer IT-2 is connected by a transmission line (preferaby coaxial as shown) to the carrier equipment. Thus, all three phase wires φ1, φ2, and φ3 of the power transmission line are coupled through coaxial lines 21, 22, 23 to the power line carrier equipment. As explained in connection with FIG. 1, these coaxial lines 21, 22, 23 may be buried underground so as to provide clearance and isolation for the power line carrier equipment. The coupling arrangement of FIG. 2 permits operation of the system even though one or two of the three coaxial lines 21, 22, 23 may fail for some reason. If the coaxial lines 21 or 23 fail, the transmitter coupling loss is 1.25 dB; if the coaxial line 22 fails, the transmitter coupling loss is 3 dB; if the coaxial lines 21 and 23 both fail, the transmitter coupling loss is 3 dB; and if the coaxial line 22 and one of the two coaxial lines 21 or 23 fail, the transmitter coupling loss is 6 dB.

Figure 3:
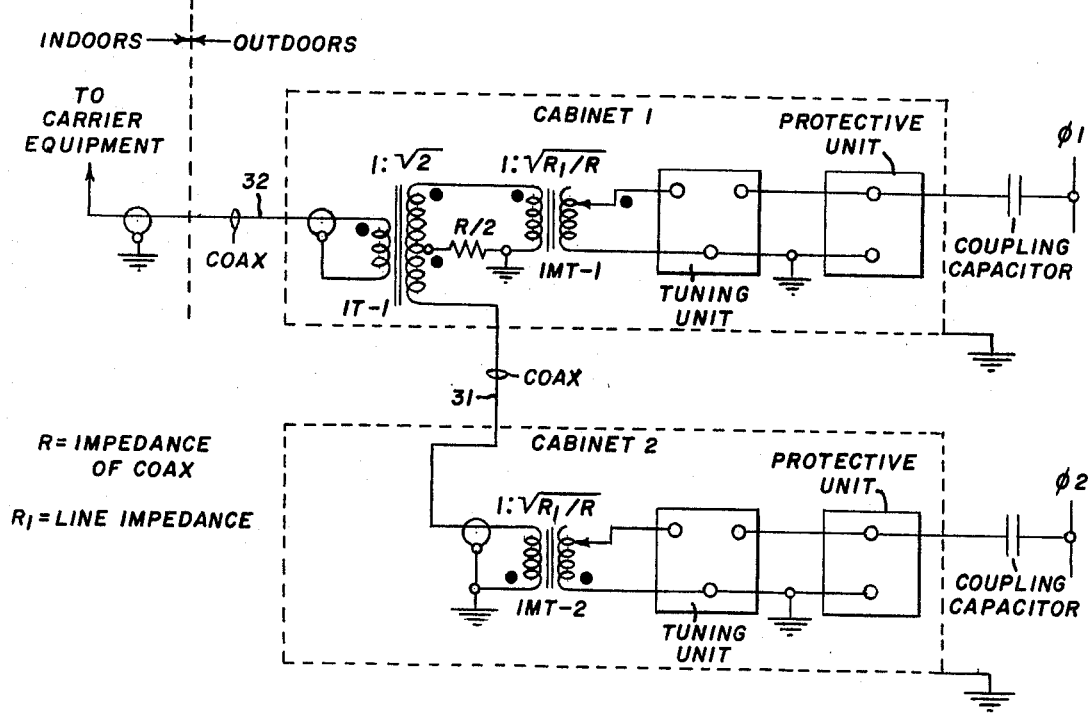
FIG. 3 shows another embodiment of my inproved coupling arrangement for coupling a power line carrier system to two phase wires of an electrical power transmission line.

In some switchyard installations, it is desirable or necessary that only one coaxial line extend from the carrier equipment to the cabinets in the switchyard. In such instances, my coupling arrangement of FIG. 3 may be used. This coupling arrangement is similar to the arrangement of FIG. 1, except that the isolation transformer IT-1 is positioned in cabinet 1. One end of its primary winding is connected through the inner conductor of a coaxial line 31 to the secondary winding of the impedance matching transformer IMT-2 in cabinet 2, and the other end of its primary winding is connected to the impedance matching transformer IMT-1 in cabinet 1. The primary winding has a center tap which is connected through a resistor R/2 tp ground as shown. The second winding of the isolation transformer IT-1 is connected through the inner conductor of a coaxial line 32, which is burned underground and extends through the switchyard, to the power line carrier equipment which may be located in a distant building. Thus, only one coaxial line 32 is required to extend from a cabinet to the power line carrier equipment. While this single coaxial line may meet the demands of existing installations, it has the disadvantage that if it fails for some reason, the carrier system fails.

Figure 5:
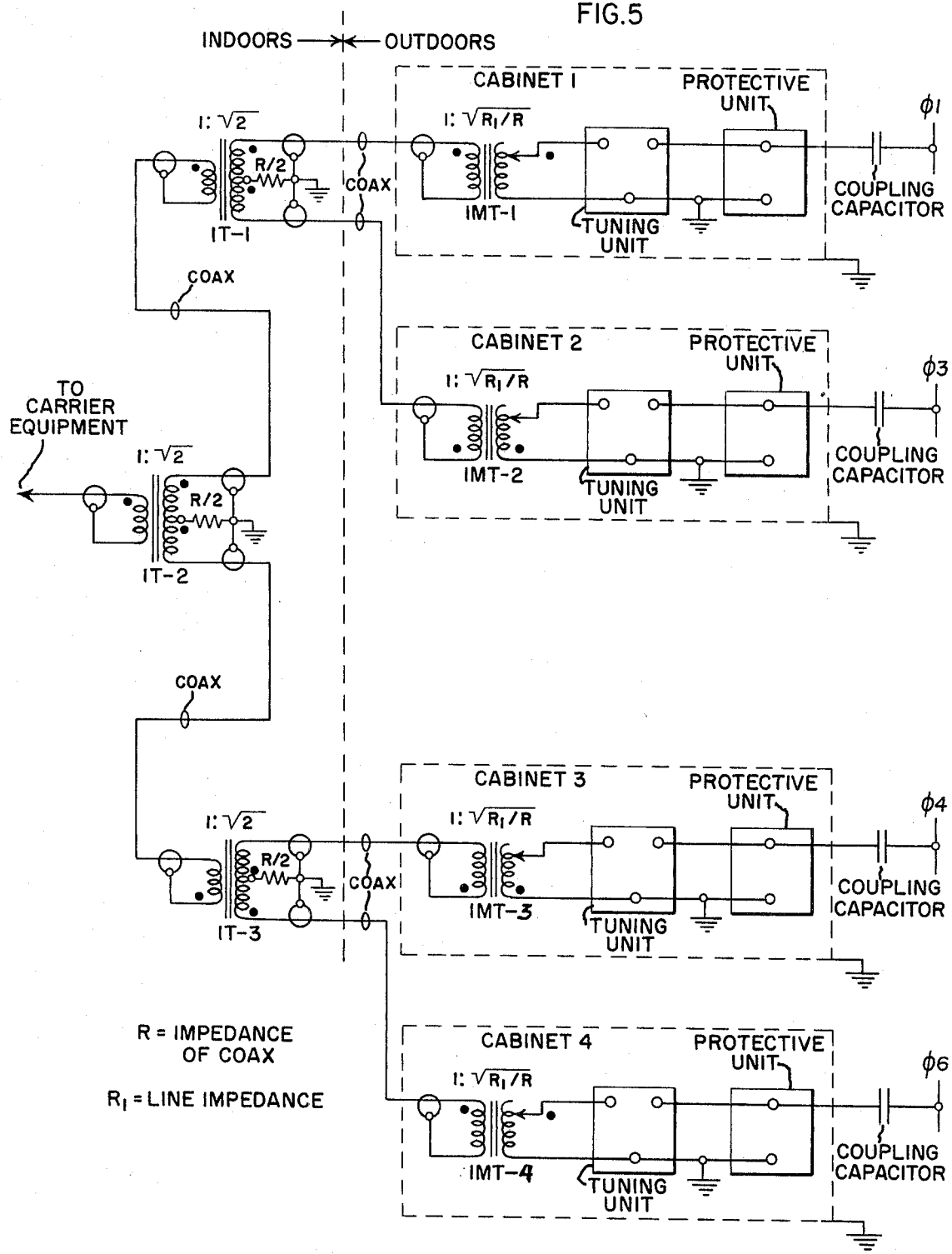
FIG. 5 shows an improved coupling arrangement in accordance with my invention for coupling a power line carrier system to four phase wires as shown in FIG. 4.

In some power installations, two three-phase systems are provided on a common set of transmission line towers. Such a system is shown in FIG. 4 with the three left hand wires providing phases 1, 2, and 3 of tone system, and with the three right hand wires providing phases 4, 5, and 6 of a second system. Studies have indicated that if a power line carrier system is coupled to phases 1, 3, 4, and 6 with respect to ground in the manner indicated in FIG. 4, a very efficient coupling and transmission of the carrier system is provided. Specifically, if the carrier system is coupled to the phase 1 and phase 6 wires at a voltage V and a reference phase (that is 0° or +) and if the carrier system is coupled to the phase 3 and phase 4 wires at the same voltage magnitude V but at an opposite phase (that is 180° or −), then very efficient coupling and transmission with relatively low losses can be achieved. My improved coupling arrangement as shown in FIG. 5 provides this coupling to the four phase wires of the system in accordance with FIG. 4. The coupling arrangement of FIG. 5 is similar to the arrangement of FIG. 1, but duplicates the arrangement so as to provide coupling for the four phases. The phase wires 1, 3, 4 and 6 are respectively coupled through units to the primary windings of impedance matching transformers IMT-1 through IMT-4. The secondary windings of the impedance matching transformers IMT-1, IMT-2 are respectively coupled by coaxial lines to the ends of the primary winding of an isolation transformer IT-1. The secondary windings of the impedance matching transformers IMT-3, IMT-4 are respectively coupled by coaxial lines to the ends of the primary winding of an isolation transformer IT-3. The secondary windings of the two isolation transformers IT-1, IT-3 are respectively coupled by coaxial lines to the primary winding of an isolation transformer IT-2. The secondary winding of the isolation transformer IT-2 is coupled through a coaxial line to the carrier equipment. Each of the primary windings of the three isolation transformers IT-1, IT-2, IT-3 has a center tap which is connected by a resistor R/2 to ground. If the impedance ratios and the polarity dots shown in FIG. 5 are observed, then the carrier signals will be supplied at a voltage magnitude V to phase wires 1 and 6 at a reference or 0° phase relation, and a carrier voltage of magnitude V is coupled to the phase wires 3 and 4 at the opposite phase of 180° with respect to the reference 0° phase. Thus, all of the advantages of the coaxial lines are utilized to greater advantage in providing coupling of the carrier system to four phase wires.

Figure 7:
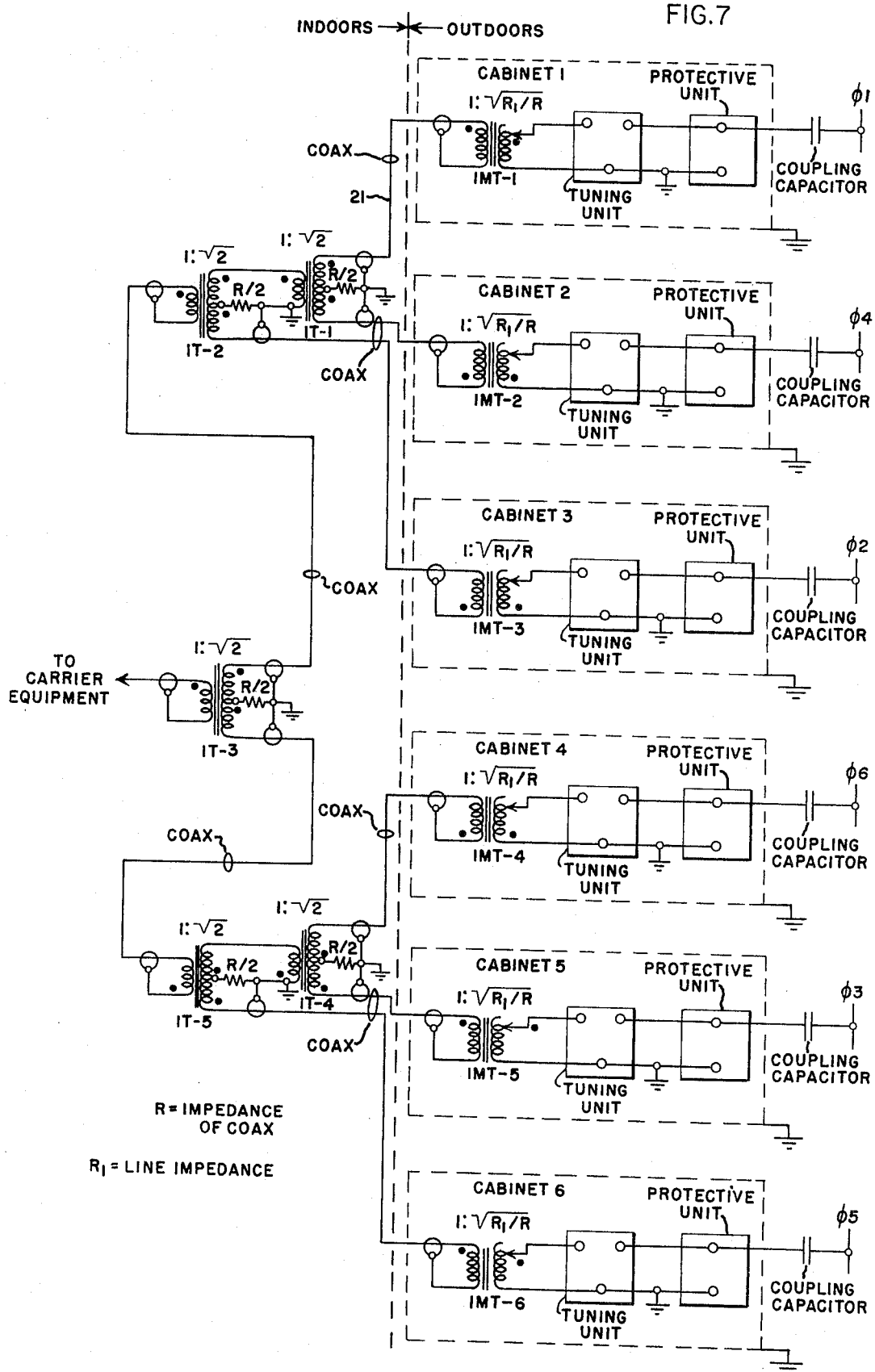
FIG. 7 shows an improved coupling arrangement in accordance with my invention for coupling a power line carrier system to all six phase wires as shown in FIG. 6.

FIG. 6 shows a similar transmission line arrangement with two systems respectfully comprising phases 1, 2, and 3, and phases 4, 5, and 6. If even better coupling and less transmission loss than provided by the arrangement of FIGS. 4 and 5 is desired, this can be achieved by coupling the carrier voltage to the various phase wires as illustrated in FIG. 6. Specifically, the carrier voltage of magnitude V is coupled to phase wires 1 and 3 at a 0° or reference phase, the carrier voltage of magnitude V is coupled to phase wires 4 and 6 at a 180° phase relation, and the carrier voltage magnitude 1.41 V is coupled to phase wires 2 and 5 at the reference or 0° phase and at the 180° phase respectively. Thus, six coupling circuits are needed, and these six coupling circuits are provided in the arrangement shown in FIG. 7. The arrangement of FIG. 7 is similar to the arrangement of FIG. 2, but duplicates that arrangement in order to provide the six couplings. Thus, each of the six phase wires are respectively coupled through units to the primary windings of impedance matching transformers IMT-1 through IMT-6. The secondary windings of the impedance matching transformers IMT-1, IMT-2 are coupled through coaxial lines to the ends of the primary winding of an isolation transformer IT-1. The secondary windings of the impedance matching transformers IMT-4, IMT-5 are coupled through coaxial lines to the ends of the primary winding of the isolation transformer IT-4. The secondary winding of the isolation transformer IT-1 and the secondary winding of the impedance matching transformer IMT-3 are coupled through coaxial lines to the ends of the primary winding of an isolation transformer IT-2. Similarly, the secondary winding of the isolation transformer IT-4 and the secondary winding of the impedance matching transformer IMT-6 are coupled through coaxial lines to the ends of the primary winding of an isolation transformer IT-5. The secondary windings of the isolation transformers IT-2, IT-5, are coupled through coaxial lines to the ends of the primary winding of an isolation transformer IT-3. The secondary winding of this isolation transformer IT-3 is coupled to the carrier equipment. With the transformers connected as shown and with the polarity dots shown in FIG. 7 being observed, the coupling at the specific voltages V or 1.41 V and at the 0° or 180° phase relations as shown in FIG. 6 can be provided. This arrangement is particularly useful where good and efficient coupling and relatively low loss are desired.

It will thus be seen that I have, through utilization of coaxial lines and suitable transformers, provided a new and improved arrangement for coupling power line carrier equipment through the switchyard cabinets with associated protective units and tuning units. The main advantage of my invention is that it eliminates the previously exposed single conductor wiring between the carrier equipment and the cabinets. Furthermore, if the arrangement of FIGS. 1 and 2 is used, my system permits operation at reduced power levels even though one of the coaxial lines may fail for some reason. While I have only shown coaxial lines and transformers in a schematic way, persons skilled in the art will appreciate that coaxial lines of different sizes and impedances may be used, and that transformers of various impedances may be used. Therefore, while my invention has been described with reference to particular embodiments, it is to be understood that modifications may be made without departing from the spirit of the invention or from the scope of the claims.

What I claim as new and desire to secure by Letters Patent of the United States is:

1. In a power line carrier system, an improved arrangement for coupling the carrier system to at least two phase wires of an electrical power transmission line, said improved arrangement comprising:
   a. first and second impedance matching transformers each having coupled primary and secondary windings;
   b. means for coupling said primary winding of said first impedance matching transformer to a first phase wire of said electrical power transmission line;
   c. means for coupling said primary winding of said second impedance matching transformer to a second phase wire of said electrical power transmission line;
   d. an isolation transformer having coupled primary and secondary windings, said primary winding having a center tap between its ends;
   e. means, including at least one coaxial line, for respectively connecting one end of each of said secondary windings of said impedance matching transformers to one of said ends of said primary winding of said isolation transformer;
   f. a common impedance having one end connected to said center tap of said isolation transformer primary winding and the other end connected to the other ends of said secondary windings of said impedance matching transformers;
   g. and a coaxial line connected to said secondary winding of said isolation transformer for connection to a carrier system.

2. The improved arrangement of claim 1 wherein said means for connecting said secondary windings of said impedance matching transformers to said primary winding of said isolation transformer comprises two coaxial lines.

3. The improved arrangement of claim 1 wherein said means for connecting said secondary windings of said impedance matching transformers to said primary winding of said isolation transformer comprises said one coaxial line and a single unbalanced line.

4. In a power line carrier system, an improved arrangement for coupling the carrier system to at least two phase wires of an electrical power transmission line, said improved arrangement comprising:
   a. first and second impedance matching transformers each having a primary winding and a secondary winding coupled thereto;
   b. means for coupling said primary winding of said first impedance matching transformer to a first of said phase wires of said electrical power transmission line;
   c. means for coupling said primary winding of said second impedance matching transformer to a second of said phase wires of said electrical power transmission line;
   d. a first isolation transformer having a primary winding with a center tap and a secondary winding coupled thereto;
   e. first and second coaxial lines each having inner and outer conductors;
   f. means for connecting said inner conductor of said first coaxial line between one end of said primary winding of said first isolation transformer and one end of said secondary winding of said first impedance matching transformer;
   g. means for connecting said inner conductor of said second coaxial line between the other end of said primary winding of said first isolation transformer and one end of said secondary winding of said second impedance matching transformer;
   h. a resistor having a magnitude substantially half the impedance of said coaxial lines;
   i. means connecting one end of said resistor to said center tap of said isolation transformer and the other end of said resistor to said outer conductors of said coaxial lines;
   j. means connecting said outer conductor of said first coaxial line to the other end of said secondary winding of said first impedance matching transformer;
   k. means connecting said outer conductor of said second coaxial line to the other end of said secondary winding of said second impedance matching transformer;
   l. and means connected to said secondary winding of said first isolation transformer for connection to a carrier system.

5. The improved arrangement of claim 4 wherein said outer conductors of said first and second coaxial lines are grounded.

6. In a power line carrier system, an improved arrangement for coupling the carrier system to at least three phase wires of an electrical power transmission line, said improved arrangement comprising:
   a. first, second and third impedance matching transformers each having a primary winding and a secondary winding coupled thereto;
   b. means for coupling said primary winding of said first impedance matching transformer to a first of said phase wires of said electrical power transmission line;
   c. means for coupling said primary winding of said second impedance matching transformer to a second of said phase wires of said electrical power transmission line;
   d. means for coupling said primary winding of said third impedance matching transformer to a third of said phase wires of said electrical power transmission line;
   e. first and second isolation transformers each having a primary winding and a secondary winding coupled thereto;
   f. means including first and third coaxial lines for respectively connecting said secondary windings of said first and third impedance matching transformers to said primary winding of said first isolation transformer;

g. means including a second coaxial transmission line for coupling said secondary winding of said second impedance matching transformer to said primary winding of said second isolation transformer;

h. means for coupling said secondary winding of said first isolation transformer to said primary winding of said second isolation transformer;

i. and means connected to said secondary winding of said second isolation transformer for connection to a carrier system.

7. In a power line carrier system, an improved arrangement for coupling the carrier system to at least four phase wires of an electrical power transmission line, said imporved arrangement comprising:

a. first, second, third, and fourth impedance matching transformers each having a primary winding and a secondary winding coupled thereto;

b. said primary windings of said impedance matching transformers being adapted to be coupled to a respective one of said four phase wires of said electrical power transmission line;

c. first and third isolation transformers each having a primary winding with a center tap and a secondary winding coupled thereto;

d. means including the inner conductor of a coaxial line for respectively coupling one end of said secondary windings of said first and second impedance matching transformers to the ends of said primary winding of said first isolation transformer;

e. means including the inner conductor of a coaxial line for respectively coupling one end of said secondary windings of said third and fourth impedance matching transformers to the ends of said primary winding of said third isolation transformer;

f. means coupling the other ends of said secondary windings of said impedance matching transformers to the outer conductors of said coaxial lines;

g. a second isolation transformer having a primary winding with a center tap and a secondary winding coupled thereto;

h. means including the inner conductor of a coaxial line for respectively coupling one end of said secondary windings of said first and third isolation transformers to the ends of said primary winding of said second isolation transformer;

i. means coupling the other ends of said secondary windings of said first and third isolation transformer to said outer conductors of said coaxial lines;

j. first, second, and third resistors each having a magnitude substantially equal to half the impedance of said coaxial lines respectively coupled between said center taps of said primary windings of said first, second, and third isolation transformers and said outer conductors of said coaxial lines;

k. and means coupled to said secondary winding of said second isolation transformer for connection to a carrier system.

8. In a power line carrier system, an improved arrangement for coupling the carrier system to at least six phase wires of an electrical power transmission line, said improved arrangement comprising:

a. first, second, third, fourth, fifth, and sixth impedance matching transformers each havin a a primary winding and a second winding coupled thereto;

b. said primary windings of said impedance matching transformers being adapted to be coupled to a respective one of said six phase wires of said electrical power transmission line;

c. first, second, third, fourth, and fifth isolation transformers each having a primary winding with a center tap and a secondary winding coupled thereto;

d. means including the inner conductor of a coaxial line for respectively coupling one end of said secondary windings of said first and second impedance matching transformers to the ends of said primary winding of said first isolation transformer;

e. means including the inner conductor of a coaxial line for respectively coupling one of said secondary windings of said fourth and fifth impedance matching transformers to the ends of said primary winding of said fourth isolation transformer;

f. means including the inner conductor of a coaxial line for respectively coupling one end of said secondary winding of said first isolation transformer and one end of said secondary winding of said third impedance matching transformer to the ends of said primary winding of said second isolation transformer;

g. means including the inner conductor of a coaxial line for respectively coupling one end of said secondary winding of said fourth isolation transformer and one end of said secondary winding of said sixth impedance matching transformer to the ends of said primary winding of said fifth isolation transformer;

h. means including the inner conductor of a coaxial line for respectively coupling one end of said secondary windings of said second and fifth isolation transformers to the ends of said primary winding of said third isolation transformer;

i. means for connecting the other ends of said secondary windings of said first through sixth impedance matching transformers and the other ends of said secondary windings of said first, second, fourth, and fifth impedance matching transformers to the outer conductors of said coaxial lines;

j. first, second, third, fourth, and fifth resistors each having a magnitude substantially equal to half the impedance of said coaxial lines respectively coupled between said center taps of said primary windings of said first, second, third, fourth, and fifth isolation transformers and said outer conductors of said coaxial lines;

k. and means coupled to said secondary winding of said third isolation transformer for connection to a carrier system.

* * * * *

UNITED STATES PATENT OFFICE
CERTIFICATE OF CORRECTION

Patent No. 3,846,638　　　　　　　Dated November 5, 1974

Inventor(s)　　Daniel L. Wetherell

It is certified that error appears in the above-identified patent and that said Letters Patent are hereby corrected as shown below:

| | |
|---|---|
| Col. 1, line 27 | after "present" insert -- , -- |
| line 35 | cancel "activites" and insert -- activities -- |
| line 64 | cancel "powerline" and insert -- power line -- |
| Col. 3, line 4 | cancel "equipkent" and insert -- equipment -- |
| line 5 | cancel "coupling capacitor 13" and insert -- a coupling capacitor 12 -- |
| line 6 | cancel "11." and insert -- 10 and a coupling capacitor 13 is connected to the point 11. -- |
| line 8 | cancel "provided" and insert -- provide -- |
| Col. 4, line 3 | cancel "IM-1" and insert -- IMT-1 -- |
| Col. 5, line 21 | cancel "tp" and insert -- to -- |

Signed and sealed this 4th day of March 1975.

(SEAL)
Attest:

RUTH C. MASON
Attesting Officer

C. MARSHALL DANN
Commissioner of Patents
and Trademarks